United States Patent [19]
Jacobs et al.

[11] Patent Number: 5,572,416
[45] Date of Patent: Nov. 5, 1996

[54] ISOLATED INPUT CURRENT SENSE MEANS FOR HIGH POWER FACTOR RECTIFIER

[75] Inventors: Mark E. Jacobs, Dallas; Richard W. Farrington; Robert J. Murphy, Jr., both of Mesquite, all of Tex.

[73] Assignee: Lucent Technologies Inc., Murray Hill, N.J.

[21] Appl. No.: 255,624

[22] Filed: Jun. 9, 1994

[51] Int. Cl.⁶ ............................. H02M 7/04; G05F 1/625
[52] U.S. Cl. .............................................. 363/89; 323/222
[58] Field of Search .................................. 363/16, 17, 21, 363/89, 125, 127; 323/222, 282, 284; 324/103 R, 103 P

[56] References Cited

U.S. PATENT DOCUMENTS

| | | | |
|---|---|---|---|
| 4,672,300 | 6/1987 | Harper | 323/222 |
| 5,391,976 | 2/1995 | Farrington et al. | 323/207 |
| 5,450,029 | 9/1995 | Jacobs et al. | 327/348 |
| 5,479,336 | 12/1995 | Motoki et al. | 363/89 |
| 5,489,837 | 2/1996 | Arakawa | 363/89 |

*Primary Examiner*—Matthew V. Nguyen
*Attorney, Agent, or Firm*—Michael J. Urbano

[57] ABSTRACT

A converter for enhancing power factor utilizes a line sense winding magnetically coupled to sense a voltage across a line inductor in the input of a high power factor power converter. This winding in the illustrative embodiment is typically a single turn. This winding provides a measurement of the derivative (with respect to time) of the line current, and a specially designed integrator connected to the winding provides the estimate of the line current. An integrator is operative to accurately estimate the current by using known properties of this current to prevent mismeasurement due to reconstructing the "constant of integration" and any small biases in the integrator which normally cause errors.

22 Claims, 2 Drawing Sheets

5,572,416

ISOLATED INPUT CURRENT SENSE MEANS FOR HIGH POWER FACTOR RECTIFIER

FIELD OF THE INVENTION

This invention concerns high power factor power converters and, in particular, to apparatus for sensing current input to the power converters.

BACKGROUND OF THE INVENTION

Power factor is enhanced in high power factor power converters by constraining the input current waveform to conform to or replicate the waveform of the input voltage. This requires that the wave shape of the input current be accurately measured. The simplest technique is to use a current sensing resistor connected into the path of the input current. However, this provides a noisy measurement of current and does not readily provide metallic isolation from the sensed current. An alternative technique uses current transformers to sense the input current waveform and provide isolation. This technique requires artificial DC restoration of the current waveform to be added due to the DC blocking characteristic of the transformer in addition to requiring significant circuit board space.

The current transformer is also unidirectional in nature due to the need for DC restoration; hence, two oppositely poled transformers must be used to obtain the total bi-directional waveform. Further difficulties include the need for core reset of the transformer core and added multiple transformers required when bi-directional power switches are used in the circuitry.

SUMMARY OF THE INVENTION

A converter for enhancing power factor utilizes a line sense winding magnetically coupled to sense a voltage across a line inductor in the input of a high power factor power converter. This line sense winding in the illustrative embodiment is typically a single turn. This winding provides a measurement of the derivative (with respect to time) of the line current, and a specially designed integrator connected to the winding provides the estimate of the line current.

A novel integrator is operative to accurately estimate the current by using known properties of this current to prevent mismeasurement due to reconstructing the "constant of integration" and any small biases in the integrator which normally cause errors.

In a correctly operating high power factor power converter, the input current is symmetrical about the zero-current point (i.e., the input current sustains essentially equal positive and negative current excursions), and after rectification by the diode bridge, it returns to zero once each half cycle. The periodic return to zero of the rectified input current is used by the integrator to estimate and remove the bias from the integration process, and, at the same time, determine in effect the "constant of integration".

In a particular embodiment of such an integrator the output of an operational amplifier integrator is measured to determine the periodic minima of its output. A voltage representing these minima is fed back to be summed with the input of the operational amplifier to compensate for the "integration constant" and offset bias voltages.

In an alternative embodiment it may be desirable to invert the polarity of the circuit, and use the output of the operational amplifier to detect the peak of the output and use that value to compensate for the "integration constant" and the offset bias voltages.

DETAILED DESCRIPTION

Figure 1:
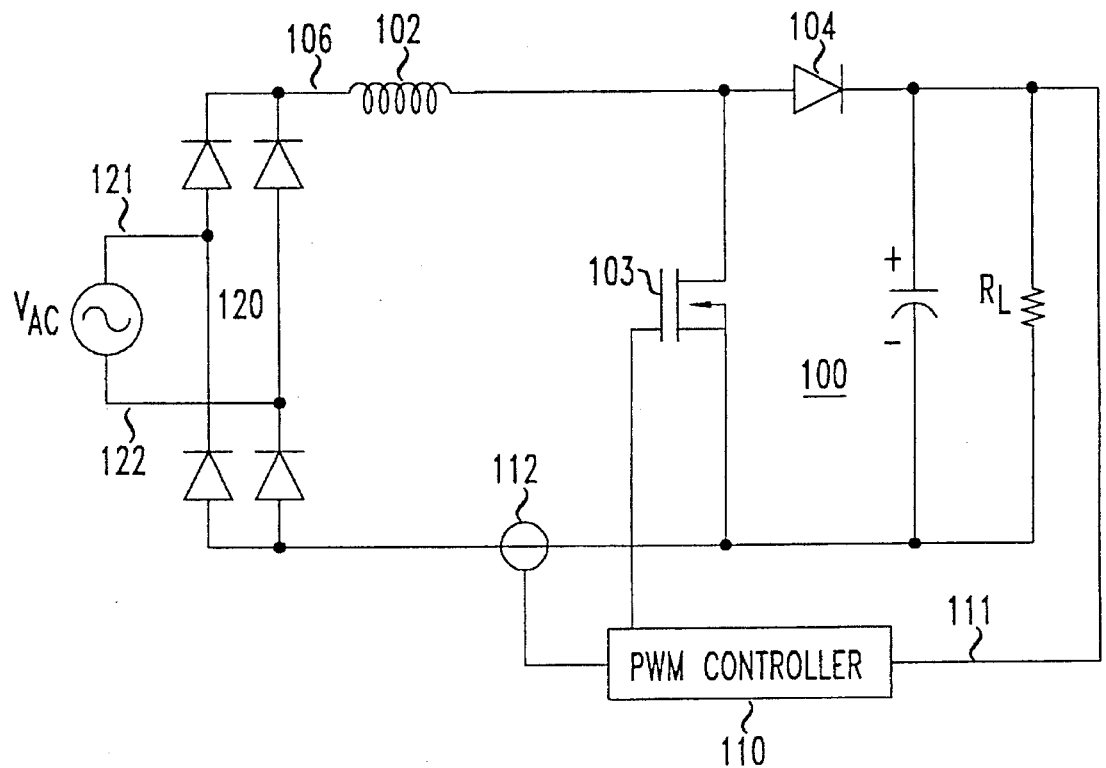
FIG. 1 is a schematic illustrating the essential elements of a typical boost switching regulator used in a high power factor switching power converter.

A typical boost power converter 100 used for enhancing power factor at the input of a high power factor rectifier is shown in the FIG. 1. The essential elements of a typical boost switching regulator used in a high power factor switching rectifier include the input inductor 102, a power switch 103, and an output rectifying diode 104. Its operation is well known to those familiar with the art. The power switch 103 periodically conducts to produce current in the inductor energized by the rectified AC input voltage, supplied by the rectifier 120, as a DC voltage which is applied at inductor terminal 106. The power switch is biased non-conducting and the back emf of the inductor 102 causes the diode 104 to conduct a current. SEPIC or other switching topologies utilizing an inductor in series with the rectified AC line can also be used for the power factor enhancing converter.

The control of the power switch 103 is in response to a PWM controller 110 which monitors the output voltage, via lead 111, and the instantaneous rectifier current, via current sensor 112. The PWM controller supplies drive current to switch the power switch alternately conducting and non-conducting at a high frequency (much higher than the frequency of the input AC voltage) to force current values sensed by current sensing device 112, with appropriate low pass filtering, to have a waveform replicating the rectified waveform of the input AC voltage applied to the input terminals 121 and 122.

Figure 2:
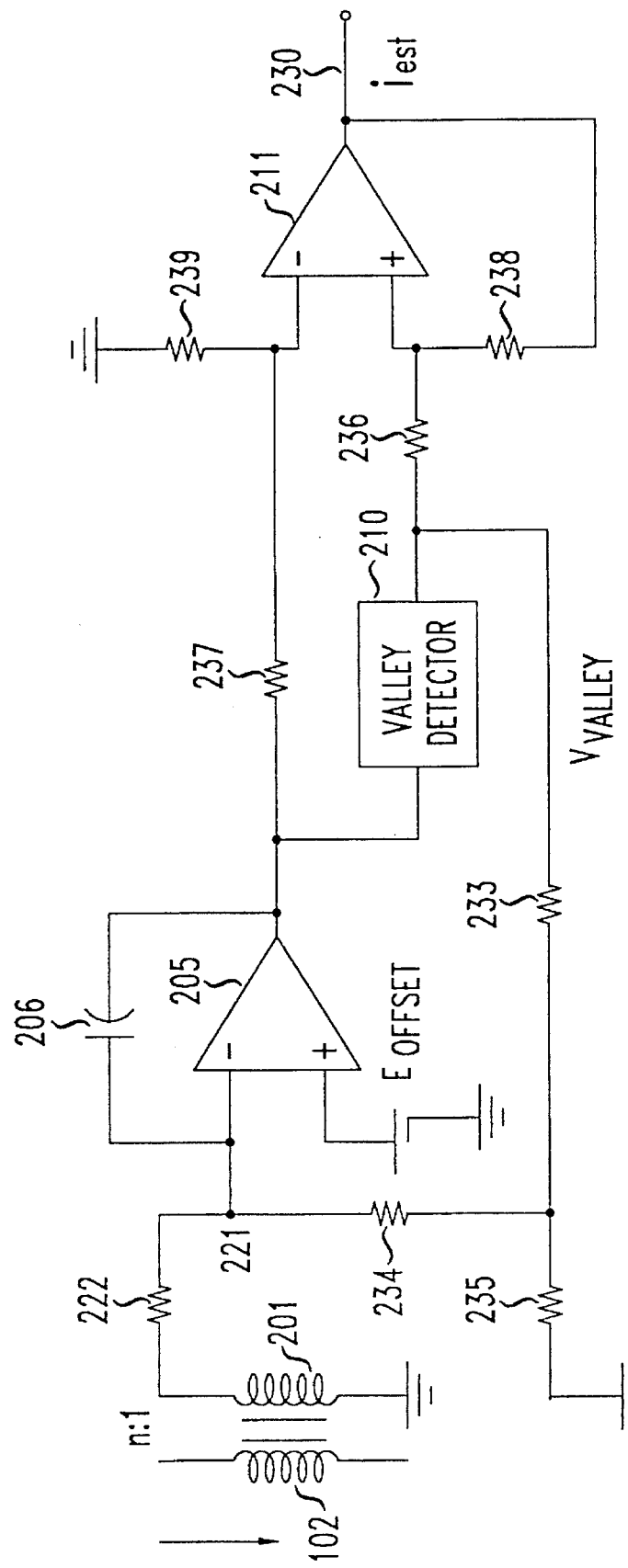
FIG. 2 is a schematic of the circuit of an integrator for measuring current from a sense winding and which incorporates the principles of the invention.

The current in the inductor 102 is monitored, in accord with the invention as shown in FIG. 2, by means of a sense winding 201 magnetically coupled to the inductor 102. The voltage of the sense winding is applied to the integration circuit to generate a signal representative of the input current. FIG. 2 shows the circuit of the new integrator which includes the sense winding 201, an operational amplifier 205, with an integrating capacitor 206, a valley detector 210 connected to the output of amplifier 205, and a differential operational amplifier 211 connected to the output of the amplifier 205 and the valley detector 210 respectively. The output of amplifier 211 is connected to the PWM controller (shown in the FIG. 1) and provides the estimate of rectified line current.

The valley detector is a circuit to detect and hold the periodic minimum values of the output of the amplifier 205. Its output of these values is fed back to the inverting input 221 of the amplifier 205 for compensating for offset and constant of integration values.

An understanding of the circuit may be derived from a description of its operation. The switching regulator input inductor 102 is coupled to a secondary current sensing winding 201 that senses the derivative of the input current:

$$e_L = \frac{-L}{n} \cdot \left(\frac{di}{dt}\right)$$

where L is the inductance of the input inductor 102, n is the ratio of the number of turns of this inductor to the number of turns of its secondary current sensing winding 201, di/dt is the derivative of the current $i_L$ flowing through the inductor 102, and $e_L$ is the voltage across the inductor's secondary current sensing winding 201.

The voltage $e_L$ representing the derivative of the input current is applied to the inverting input of an integrator consisting of operational amplifier 205, via the resistor 222, and the integrating capacitor 206. The output voltage of amplifier 205 is of the form of a rectified sine wave, with superimposed high frequency ripple due to the switching operation of the high frequency switching regulator. In general, the output of integrating amplifier 205 drifts due to small input offset biases and other small nonuniformities inherent in any real circuit design; these biases ordinarily prevent the use of such circuits to estimate an input current. These small biases are conceptually represented in FIG. 2 by the representative battery voltage $E_{offset}$ included in the ground connection of the non-inverting input. A typical magnitude of $E_{offset}$ can be about a millivolt and depends on the choice of the operational amplifier.

A valley detector 210 (a negative "peak detector"), detects and holds the minima of the periodic output voltages from amplifier 205 which occur periodically at a 100 or 120 Hz rate for AC line frequencies of 50 or 60 Hz. The output voltage of the valley detector 210 is designed to drift upward at a rate of about 0.5 V/sec to allow the circuit to detect each new voltage minimum as it occurs every 8–10 msec. The output voltage from the valley detector $V_{valley}$ is thus a measure of the voltage minima from the integrator and has a small superimposed sawtooth error waveform of several millivolts in amplitude due to the small added upward drift.

The output voltage from the valley detector is fed back to the inverting input of the integrator by means of the voltage divider consisting of resistors 233 and 235. Resistor 234 causes this voltage to be summed at the inverting input of integrating amplifier 205. This feedback process produces an offset voltage for integrating amplifier 205 to compensate for the previously described biases in the integration process.

Although the offsets in integrating amplifier 205 are compensated by the feedback process, its output can still exhibit a slowly varying output offset bias due in part to the finite gain and bandwidth of the feedback process from the valley detector 210. Differential amplifier 211 and the associated resistors 236, 237, 238 and 239 are operative to remove the remaining but slowly varying output offset bias from integrating amplifier 205. The resistors 236, 237, 238 and 239 for this differential amplifier 211 are selected to satisfy the proportion $$\frac{R_{238}}{R_{236}} = \frac{R_{239}}{R_{237}}$$

so that amplifier 211 subtracts the output voltage of the valley detector 210 ($V_{valley}$) from the output voltage of the integrator 205, thus producing an accurate and steady estimate of the input line current on output lead 230.

For proper operation of this current sense circuit it is necessary that the operational amplifier 205 not only present a very high input impedance at its inverting input, but also that short term variations of its input bias current be insignificant when measured against the size of the capacitor 206 for at least several periods of the input AC waveform. This generally requires the use of a FET—input operational amplifier for amplifier 205 such as an LM6082; a bipolar transistor—input operational amplifier exhibits a dependence of the input bias current on changes in the input voltage, and would not ordinarily be suitable.

The relationship between the output voltage $e_{230}$ on output lead 230 and the current $i_L$ to be measured flowing through the input inductor is given by $$i_{est} = \left(\frac{L}{nR_1C_1}\right) \cdot \left(\frac{R_{238}}{R_{236}}\right) \cdot i_L.$$

Figure 3:
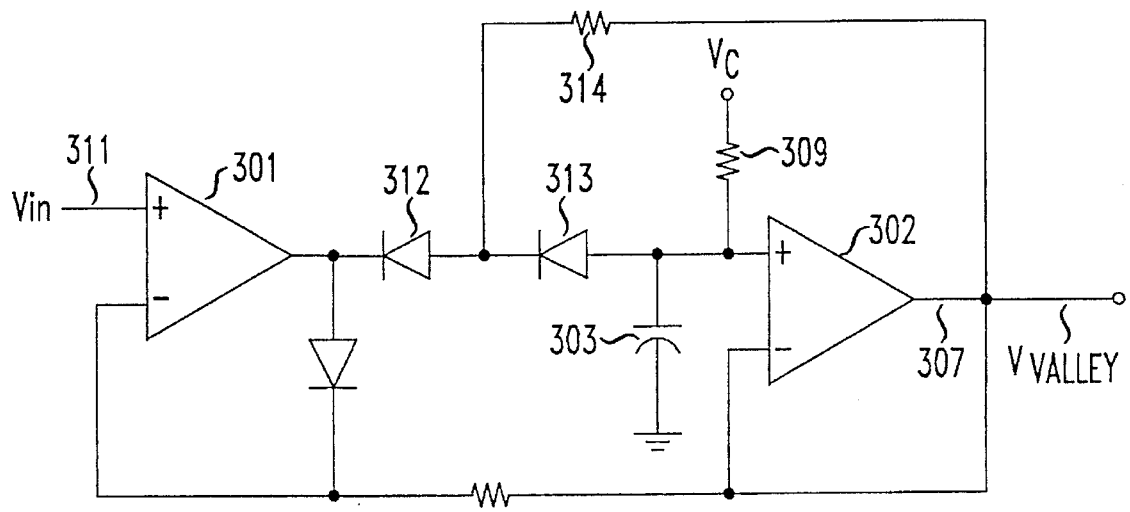
FIG. 3 is a schematic of a valley detector circuit used in the integrator of FIG. 2.

A valley detector suitable for use with the current sense circuit is shown in the FIG. 3. A valley detector may be considered to be a peak detector with the diodes reversed in polarity. The valley detector of FIG. 3 includes two operational amplifiers 301 and 302. The operational amplifier 301 is connected to charge and set the voltage of a capacitor 303 to a value equaling the minimum value of the input voltage at lead 311 connected to the non-inverting input of the operational amplifier 301.

The second operational amplifier 302 provides a high impedance sense for the voltage on the capacitor 303. A very high impedance resistor 309 connects a positive bias voltage source to the non-inverting input of the operational amplifier 302 and allows the voltage on the capacitor 303 to slowly drift upward between the detections of the minimum value of the voltage at lead 311.

The output of the operational amplifier 301 is connected through two series connected diodes 312 and 313 to the non-inverting input of the operational amplifier 302. A resistive impedance 314 connects the junction of the two diodes 312 and 313 to the output lead 307 of the operational amplifier 302. The diode 313 and the resistive impedance 314 operate to compensate for any effects of temperature sensitive reverse leakage of the diode 312 which would improperly increase the charge stored on the capacitor 303.

It is readily apparent to those skilled in the art that the use of a peak detector may be substituted for the valley detector by changing the polarity orientation of the sense winding of FIG. 2.

We claim:

1. An AC to DC Power Converter connected to an AC line; including:

an input rectifier connected to the AC line;

a switching regulator connected to receive rectified AC from the input rectifier through an input inductor;

sensing means for monitoring a current flow between the rectifier and switching regulator through the input inductor; the sensing means including:

a sense winding magnetically coupled to the input inductor;

an integrating circuit connected to receive at an input the output voltage of the sense winding;

a valley detector connected to an output of the integrating circuit and including circuitry for detecting and storing a voltage minimum of the output of the integrating circuit; and a feedback connection coupling the voltage output of the valley detector to an input of the integrating circuit.

2. An AC to DC Power Converter as claimed in claim 1, further including drift circuitry for allowing a voltage output of the valley detector to drift upward at a controlled rate.

3. An AC to DC Power Converter as claimed in claim 1, further including:

control means connected for controlling intermittent switching of a power switch of the switching regulator in response to an output of the integrating means.

4. An AC to DC Power Converter as claimed in claim 1, wherein the switching regulator is a boost converter.

5. An AC to DC Power Converter as claimed in claim 1, wherein the switching regulator is a SEPIC converter.

6. An AC to DC Power Converter as claimed in claim 1, wherein the switching regulator includes an IGBT power switching device.

7. An AC to DC Power Converter as claimed in claim 1, wherein the switching regulator includes a FET power switching device.

8. An AC to DC Power Converter as claimed in claim 1, wherein the circuitry for allowing a voltage to drift upward includes a RC circuit connected to allow a voltage of its capacitor while charging to control a drift rate of the voltage level at the output.

9. An AC to DC Power Converter as claimed in claim 1, wherein the rectifier is a full wave bridge rectifier.

10. An AC to DC Power Converter as claimed in claim 1, wherein the integrating circuit includes an integrating operational amplifier.

11. An AC to DC Power Converter as claimed in claim 1, further including an output, and a diode connecting the input inductor to the output.

12. An AC to DC Power Converter as claimed in claim 11, further including a filter capacitor connected to the output.

13. An AC to DC Power Converter as claimed in claim 3 wherein the control means includes a PWM controller for controlling conduction of the power switch in short intervals at a frequency substantially greater than that of the AC line.

14. An AC to DC Power Converter connected to an AC line; including:

an input full wave bridge rectifier connected to the AC line;

a switching regulator including a power switching device and connected to receive rectified AC from the input rectifier through an input inductor;

an output, and a diode connecting the input inductor to the output;

sensing means including a sense winding magnetically coupled to the input inductor, for monitoring a current flow between the rectifier and switching regulator through the input inductor; the sensing means including:

an integrating circuit including an integrating operational amplifier connected to receive at an input the output voltage of the sense winding;

a valley detector connected to an output of the integrating circuit and including circuitry for detecting and storing a voltage minimum of the output of the integrating circuit and the circuitry for storing including a drift control circuit connected to allow a voltage of its capacitor while charging to control a drift rate of the voltage level at the output and operative for allowing a voltage output of the valley detector to drift upward at a controlled rate; and control means including a PWM controller connected for controlling intermittent switching of the power switch of the switching regulator at a frequency greater than that of the AC line in response to an output of the integrating means.

15. An AC to DC Power Converter as claimed in claim 14, wherein the switching regulator is a boost converter.

16. An AC to DC Power Converter as claimed in claim 14, wherein the switching regulator is a SEPIC converter.

17. An AC to DC Power Converter as claimed in claim 14, wherein the switching regulator includes a Flit power switching device.

18. An AC to DC Power Converter as claimed in claim 14, wherein the switching regulator includes an IGBT power switching device.

19. A boost power converter connected to be powered from an AC line and operative for enhancing the power factor at its input, comprising:

a rectifier connected to receive energy off of the AC line;

a boost inductor connected to receive the rectified signal output of the rectifier;

a power switch enabled conducting in short intervals as compared to a period of a signal supplied by the AC line and connected to draw current flow from the rectifier through the boost inductor;

a diode for coupling an output of the boost inductor to an output terminal;

a filter capacitor connected for sustaining a DC output voltage;

a PWM controller for controlling the conduction of the power switch in short intervals;

current sensing means connected for sensing a current flow through the rectifier and for applying a sense signal to the PWM controller; the current sensing means including:

an integrator adapted to compensate for the integration constant and remove offset bias voltages comprising an integrating operational amplifier and a valley detector connected to detect voltage minima of the output of the integrating operational amplifier and supply a feedback signal representing the voltage minima to an input of the integrating operational amplifier.

20. An AC to DC Power Converter connected to an AC line; including:

an input rectifier connected to the AC line;

a switching regulator connected to receive rectified AC from the input rectifier through an input inductor;

sensing means for monitoring a current flow between the rectifier and switching regulator through the input inductor; including:

a sense winding magnetically coupled to the input inductor;

an integrating circuit connected to receive at an input the output voltage of the sense winding;

a peak detector connected to an output of the integrating circuit and including circuitry for detecting and storing a voltage peak of the output of the integrating circuit; and a feedback connection coupling the voltage output of the peak detector to an input of the integrating circuit.

21. An AC to DC Power Converter as claimed in claim 20, further including drift circuitry for allowing a voltage output of the peak detector to drift downward at a controlled rate.

22. A boost power converter connected to be powered from an AC line and operative for enhancing the power factor at its input, comprising:

a rectifier connected to receive energy off of the AC line;

a boost inductor connected to receive the rectified signal output of the rectifier;

a power switch enabled conducting in short intervals as compared to a period of a signal supplied by the AC line and connected to draw current flow from the rectifier through the boost inductor;

a diode for coupling an output of the boost inductor to an output terminal;

a filter capacitor connected for sustaining a DC output voltage;

a PWM controller for controlling the conduction of the power switch in short intervals;

current sensing means connected for sensing a current flow through the rectifier and for applying a sense signal to the PWM controller; the current sensing means including:

an integrator adapted to compensate for the integration constant and remove offset bias voltages comprising an integrating operational amplifier and a peak detector connected to detect voltage peaks of the output of the integrating operational amplifier and including circuitry to supply a feedback signal representing the voltage peaks to an input of the integrating operational amplifier.

* * * * *